(12) United States Patent
Takahashi (10) Patent No.: US 9,988,724 B2
(45) Date of Patent: Jun. 5, 2018

(54) INORGANIC POLARIZING PLATE HAVING TRAPEZOID SHAPED METAL LAYERS AND PRODUCTION METHOD THEREOF

(71) Applicant: DEXERIALS CORPORATION, Shinagawa-ku, Tokyo (JP)

(72) Inventor: Eiji Takahashi, Tokyo (JP)

(73) Assignee: DEXERIALS CORPORATION, Shinagawa-Ku, Tokyo (JP)

( * ) Notice: Subject to any disclaimer, the term of this patent is extended or adjusted under 35 U.S.C. 154(b) by 5 days.

(21) Appl. No.: 14/820,286

(22) Filed: Aug. 6, 2015

(65) Prior Publication Data
US 2016/0054497 A1 Feb. 25, 2016

(30) Foreign Application Priority Data

Aug. 22, 2014 (JP) .................... 2014-169274

(51) Int. Cl.
*G02B 5/30* (2006.01)
*C23F 1/12* (2006.01)
(Continued)

(52) U.S. Cl.
CPC .............. *C23F 1/12* (2013.01); *G02B 5/3058* (2013.01); *G02B 1/08* (2013.01); *G02B 27/28* (2013.01);
(Continued)

(58) Field of Classification Search
None
See application file for complete search history.

(56) References Cited

U.S. PATENT DOCUMENTS 6,243,199 B1 * 6/2001 Hansen ................ G02B 5/3058
359/485.05
6,772,608 B1 8/2004 Drost et al.
(Continued)

FOREIGN PATENT DOCUMENTS

EP          0 999 459 A2    5/2000
JP          2000-147253 A   5/2000
(Continued)

OTHER PUBLICATIONS

Baba, K. et al., "Anisotropic Optical Media From Laminated Island Films: Theory", J. Opt. Soc. Am. A., Apr. 1991, pp. 619-624, vol. 8, No. 4.

(Continued)

Primary Examiner — Stephone B Allen
Assistant Examiner — Ryan S Dunning
(74) Attorney, Agent, or Firm — Buchanan, Ingersoll & Rooney PC (57) ABSTRACT

An inorganic polarizing plate, which contains: a substrate transparent to light in a wavelength range for use; linear metal layers; linear dielectric layers; and linear light-absorbing layers having a light absorbing function, provided in this order, wherein the linear metal layers are aligned being apart from each other on the substrate at a pitch shorter than wavelengths of the light; each of the linear dielectric layers is provided on each of the linear metal layers; each of the linear light-absorbing layers is provided on each of the linear dielectric layers; and a cross-sectional shape of the linear metal layer cut in a direction orthogonally crossing a longitudinal direction thereof is a trapezoid with a bottom base at a side of the substrate, and an upper base at a side of the linear dielectric layer, where the bottom base is longer than the upper base.

7 Claims, 9 Drawing Sheets (51) Int. Cl.
G02B 1/08 (2006.01)
G02F 1/1335 (2006.01)
G02B 27/28 (2006.01)
G02F 1/01 (2006.01)

(52) U.S. Cl.
CPC ............... *G02F 1/0136* (2013.01); *G02F 2001/133548* (2013.01)

(56) References Cited

U.S. PATENT DOCUMENTS

| | | |
|---|---|---|
| 2005/0128587 A1 | 6/2005 | Suganuma |
| 2005/0275944 A1 | 12/2005 | Wang et al. |
| 2006/0039069 A1* | 2/2006 | Hayashi ............... G02B 5/3058 359/485.05 |
| 2006/0273067 A1* | 12/2006 | Smirnov ............... G02B 5/3058 216/24 |
| 2008/0186576 A1* | 8/2008 | Takada ................. G02B 5/3025 359/487.03 |
| 2009/0009865 A1* | 1/2009 | Nishida ................ G02B 5/3058 359/485.01 |
| 2009/0041971 A1* | 2/2009 | Wang ................... G02B 5/1809 428/54 |
| 2011/0279900 A1 | 11/2011 | Wang et al. |

FOREIGN PATENT DOCUMENTS

| | | |
|---|---|---|
| JP | 2002-372620 A | 12/2002 |
| JP | 2003-508813 A | 3/2003 |
| JP | 2005-172844 A | 6/2005 |
| JP | 2008-502948 A | 1/2008 |
| JP | 2008-216956 A | 9/2008 |
| JP | 2008-216957 A | 9/2008 |
| JP | 2010-501085 A | 1/2010 |
| JP | 2011-113631 A | 6/2011 |
| JP | 2012-27221 A | 2/2012 |
| JP | 2012-73484 A | 4/2012 |

OTHER PUBLICATIONS

Shiraishi, K. et al., "Microisolator", Applied Optics, Jan. 15, 1986, pp. 311-314, vol. 25, No. 2.

Shiraishi, K. et al., "Laminated Polarizers Exhibiting High Performance Over a Wide Range of Wavelength", Journal of Lightwave Technology, Jun. 1997, pp. 1042-1050, vol. 15, No. 6.

Notice of Reasons of Rejection issued by the Japanese Patent Office in corresponding Japanese Patent Application No. 2014-169274 dated Apr. 5, 2016 (4 pages including English translation).

* cited by examiner

INORGANIC POLARIZING PLATE HAVING TRAPEZOID SHAPED METAL LAYERS AND PRODUCTION METHOD THEREOF

BACKGROUND OF THE INVENTION

Field of the Invention

The present invention relates to an inorganic polarizing plate, and a production method thereof.

Description of the Related Art

As in a liquid crystal display device, it is necessary to provide a polarizing plate at a surface of a liquid crystal panel due to image formation principles thereof. The functions of the polarizing plate is to absorb one of the polarizing components (i.e., p-waves, and s-waves) orthogonal to each other, and passing through the other component.

Conventionally, a dichroic polarizing plate containing an iodine-based or dye-based polymeric organic material within a film has been widely used as the aforementioned polarizing plate. As for a typical production method of such the polarizing plate, used is a material containing dying a polyvinyl alcohol-based film with a dichroic material, such as iodine, crosslinking using a crosslinking agent, and performing uniaxial drawing. As the dichroic polarizing plate is produced by drawing as mentioned above, the dichroic polarizing plate is typically easily shrunk. Moreover, a hydrophilic polymer is used in the polyvinyl alcohol-based film, therefore, it is extremely easily deformed, particularly under humid conditions. Moreover, the polarizing plate fundamentally uses a film, and hence a mechanical strength as a device is weak. In order to avoid this, a method for bonding a transparent protective film to the polarizing plate has been used.

Recently, use of liquid crystal display devices has been increased, and performances thereof have been improved. Along with this trend, high reliability and durability have been demanded for each device constituting a liquid crystal display device. In case of a liquid crystal display device using a light source of a largo high radiation intensity, such as a transmissive liquid crystal projector, for example, a polarizing plate receives strong radiant rays. Therefore, the polarizing plate for the aforementioned use requires excellent heat resistance. As the aforementioned film-based polarizing plate is organic matter, there are limits for improving the aforementioned properties.

In USA, an inorganic polarizing plate having high heat resistance has been on marked under the product name of Polarcor from Corning Incorporated. This polarizing plate has a structure where silver particles are scattered in glass, and does not use an organic material, such as a film. The principle thereof uses plasma resonance of island-state particles. Specifically, light absorption due to surface Plasmon resonance is utilized when light enters the island-state particles of rare metal or transmission metal, and the absorption wavelength is influenced by shapes of the particles, or a dielectric constant of the surroundings. When the shapes of the island-state particles are ovals, the resonance wavelength is difference between the major axis direction thereof, and the minor axis direction thereof. As a result, polarizing properties can be attained. Specifically, the polarizing properties that the polarizing component parallel to the major axis is absorbed at the side of the long wavelength side, and the polarizing component parallel to the minor axis is passed through can be attained. In case of Polarcor, however, the wavelength range with which the polarizing properties can be attained, is a region close to the infrared region, and does not cover a visible region required by a liquid crystal display device. It is assumed that this is because of physical characteristics of silver used for island-state particles.

U.S. Pat. No. 6,772,608 discloses an UV polarizing plate, in which particles are precipitated in glass by thermal reduction, using the aforementioned principle, and discloses that use of silver as a specific example of metal particles. In this case, it is assumed that the absorption at the minor axis direction is used, different from the aforementioned Polarcor. As depicted in FIG. 1 therein, the disclose polarizing plate functions as a polarizing plate even at the range adjacent to 400 nm, but the extinction ratio is small and the band of the light that can be absorbed is extremely narrow. Therefore, even by combining Polarcor and the technology disclosed in U.S. Pat. No. 6,772,608, a polarizing plate that can cover an entire visible range cannot be attained.

Moreover, a theoretical analysis of an inorganic polarizing plate using plasma resonance of island-sate metal particles is disclosed in J. Opt. Soc. Am. A, Vol. 8, No. 4, 619-624. According to this literature, a resonance wavelength of aluminium particles is shorter than that of silver particles by about 200 nm. It is disclosed that there is a possibility that a polarizing plate covering a visible range can be produced by using aluminium particles.

Moreover, Japanese Patent Application Laid-Open (JP-A) No. 2000-147253 discloses several production methods of a polarizing plate using, aluminium particles. In this literature, it is described that silicate-based glass is not desirable as a substrate, as aluminium and glass are reacted, and calcium.aluminoborate glass is suitable as a substrate (the paragraphs [0018], [0019]). However, glass using silicate is widely distributed as optical glass, and highly reliable products thereof can be available at low cost. Therefore, it is not economically preferable, if these products are not suitable for use as a substrate. Moreover, a method for forming island-state particles through etching a resist pattern is described therein (the paragraphs [0037], [0038]). Typically, a polarizing plate used in a projector needs a size of about several centimeters, and requires a high extinction ratio. In the case where a polarizing plate is intended to be a polarizing plate for visible light, therefore, a size of a resist pattern for use needs to be sufficiently shorter than visible light wavelengths, i.e., several tens nanometers. Moreover, a highly dense pattern needs to be formed to attain a high extinction ratio. In the case where the polarizing plate is used for a projector, moreover, a pattern of a large area needs to be formed. However, the method for applying the high-density fine pattern formation using the disclosed lithography needs use electron beam drawing in order to attain the pattern, as mentioned above. The electron beam drawing is a method for drawing each pattern with electron beams, productivity thereof is poor, and therefore it is not practical.

Moreover, JP-A No. 2000-147253 discloses that aluminium is removed by chlorine plasma. In the case where etching is performed in this manner, typically, chloride is deposited on side walls of the aluminium pattern. It is possible to remove the chloride with a commercially available etching solution (e.g., SST-A2 of Tokyo Ohka Kogyo Co., Ltd.), but such a chemical fluid, which reacts with aluminium chloride, also reacts with aluminium, although etching speed thereof is slow. Therefore, it is difficult to realize formation of a desired pattern using the disclosed method.

Furthermore, JP-A No. 2000-147253 discloses, as another method, a method containing depositing aluminium on a patterned photoresist through oblique film formation, and removing the photoresist (the paragraphs [0045], [0047]). However, it is assumed that it is necessary to deposit aluminium on a surface of a substrate to some degrees in order to attain adhesion between substrate and aluminium in this method. This means that a shape of the deposited aluminium film is different from a prolate sphere including a prolate oval, which is described as a suitable shape in the paragraph [0015]. Moreover, it is described in the paragraph [0047] that the excessive deposits are removed by anisotropic etching vertical to the surface. In order to function as a polarizing plate, anisotropy of a shape of the aluminium is important. Accordingly, it is assumed that it is necessary to adjust an amount of the aluminium deposited on the resist part and the substrate surface in order to attain a desired shape. However, it is considered that it is extremely difficult to control in a size of submicron or smaller, e.g., 0.05 µm, as described in the paragraph [0047]. Therefore, doubt remains whether or not this method is suitable as a production method of high productivity. As for properties of a polarizing plate, high transmittance is required in a transmission axial direction. In the case where glass is used as a substrate, typically, a few percent of reflection at an interlace of the glass cannot be avoided, and hence it is difficult to attain high transmittance.

Moreover, JP-A No. 2002-372620 discloses a polarizing plate formed through oblique deposition. This method is to attain polarizing properties by producing a fine prismatic structure through oblique deposition of material that is transparent or opaque to wavelengths of light in a wavelength range for use, and is a method having high productivity, as a fine pattern can be attained with a simple method, different from JP-A No. 2000-147253. However, this method also has a problem. An aspect ratio of the formed fine prismatic structure of the material transparent or opaque to a wavelength range for use, a pitch of individual prisms in the fine prismatic structure, and a linearity are important elements for attaining excellent polarizing properties, and these should be intentionally controlled in view of reproducibility of the properties. In this method, however, used is a phenomenon that a prismatic structure is obtained, as depositing particles are not deposited in shadow areas of an initial deposition layer formed by previously deposited particles. Therefore, it is difficult to intentionally control the aforementioned items. As a method for improving this problem, a method for providing polishing traces on a substrate by a rubbing process before the deposition is described. However, diameters of particles constituting a deposition film are typically about several ten nanometers, and it is necessary to intentionally produce a pitch of submicron or smaller through polishing, in order to control anisotropy of these particles. When a typical polishing sheet is used, a size of about submicron is the limit. Therefore, it is not easy to produce such fine polishing traces. As described earlier, moreover, a resonance wavelength of Al particles largely depends on a refractive index of the surroundings. In this case, it is importance to combine a transparent material and an opaque material. In JP-A No. 2002-372620, a combination for attaining excellent polarizing properties in a visible region is not disclosed. In the case where glass is used as a substrate, similarly to JP-A No. 2000-147253, reflectance of several percent at an interface of the glass cannot be avoided.

Moreover, Applied Optics, Vol. 25, No. 21986 311-314 discloses a polarizing plate for infrared transmission, which is called Lamipol. This polarizing plate has a laminate structure of Al and $SiO_2$. According to the literature, the polarizing plate exhibits an extremely high extinction ratio. Moreover, J. Lightwave Tec., Vol. 15, No. 6, 1997, 1042-1050 discloses that a high extinction ratio with a wavelength of 1 µm or shorter can be realized by using Ge instead of Al of Lamipol, which is configured to absorb light. From FIG. 3 of this literature, it is expected that a high extinction ratio can be also attained using tellurium (Te). As described above, Lamipol is an absorbing polarizing plate with which a high extinction ratio can be attained. However, it is not suitable for a polarizing plate for a projector, which requires a size of a several centimeter in each side, as a thickness of a laminate of a light-absorbing material, and a transmissive material becomes a size of a light-accepting surface.

Furthermore, JP-A No. 2008-216957 discloses a polarizing plate combining a wire grid structure, and an absorbing film. In the case where a metal or semiconductor film is used as the absorbing film, it is largely influenced by optical properties of the material. Therefore, it is possible to reduce reflectance of light in a certain region by adjusting film thicknesses of dielectric materials between the material, the wire grid, and the absorbing film. However, it is difficult to realize the reduction of reflectance in a wider wavelength range.

Moreover, it is possible to widen the bandwidth by using Ta or Ge having high absorbance. However, the absorbance in the transmission axis direction also increases, which reduces the transmittance in the transmission axis direction, which is one of important properties of the polarizing plate.

Moreover, JP-A No. 2011-113631 and JP-A No. 2003-508813 each disclose an inorganic polarizing plate, in which a cross-sectional shape of a metal wire in a wire grid layer is a trapezoid. In the proposed technologies, however, polarizing properties are not sufficient.

Accordingly, there currently needs for providing an inorganic polarizing plate having excellent polarizing properties, and a production method thereof.

SUMMARY OF THE INVENTION

The present invention aims to solve the aforementioned various problems in the art, and achieve the following object. Specifically, an object of the present invention is to provide an inorganic polarizing plate having excellent polarizing properties, and a production method thereof.

The means for solving the aforementioned problems are as follows.

<1> An inorganic polarizing plate, containing:
  a substrate that is transparent to light in a wavelength range for use;
  a plurality of linear metal layers;
  a plurality of linear dielectric layers; and
  a plurality of linear light-absorbing layers having a light absorbing function, where the substrate, the linear metal layers, the linear dielectric layers, and the linear light-absorbing layers are provided in this order,
  wherein the linear metal layers are aligned being apart from each other on the substrate at a pitch shorter than wavelengths of the light,
  wherein each linear dielectric layer of the linear dielectric layers is provided on each linear metal layer of the linear metal layers,
  wherein each linear light-absorbing layer of the linear light-absorbing layers is provided on each linear dielectric layer of the linear dielectric layers, and
  wherein a cross-sectional shape of the linear metal layer cut in a direction orthogonally crossing a longitudinal direction of the linear metal layer is a trapezoid with a bottom base being at a side of the substrate, and an upper base being at a side of the linear dielectric layer, where a length of the bottom base is longer than a length of the upper base.

<2> The inorganic polarizing plate according to <1>, wherein a difference between the length of the bottom base and the length of the upper base [(the length of the bottom base)−(the length of the upper base)] is 1.0 nm to 20.0 nm in the cross-sectional shape of the linear metal layer.
<3> The inorganic polarizing plate according to <1> or <2>, wherein an average thickness of the linear metal layer is 20 nm to 400 nm.
<4> The inorganic polarizing plate according to any one of <1> to <3>, wherein a material of the linear metal layer is aluminium, or an aluminium alloy.
<5> The inorganic polarizing plate according to any one of <1> to <4>, wherein a material of the linear dielectric layer is $SiO_2$.
<6> The inorganic polarizing plate according to any one of <1> to <5>, wherein a material of the linear light-absorbing layer is Si, or silicide.
<7> The inorganic polarizing plate according to <6>, wherein the silicide is silicide containing Fe in an amount of 10 atm % or less.
<8> The inorganic polarizing plate according to <6>, wherein the silicide is silicide containing Ta in an amount of 40 atm % or less.
<9> The inorganic polarizing plate according to any one of <1> to <8>, wherein a material of the substrate is glass, crystal, or sapphire.
<10> A production method of the inorganic polarizing plate according to any one of <1> to <9>, containing:
  etching a metal layer formed on the substrate using etching gas containing $N_2$.
<11> The production method according to <10>, wherein the etching gas contains $Cl_2$ and $BCl_3$.

The present invention can solve the aforementioned various problems in the art, achieve the aforementioned object, and provide an inorganic polarizing plate having excellent polarizing properties, and a production method thereof.

DETAILED DESCRIPTION OF THE INVENTION (Inorganic Polarizing Plate)

The inorganic polarizing plate of the present invention contains at least a substrate, a plurality of linear metal layers, a plurality of linear dielectric layers, and a plurality of linear light-absorbing layers in this order, and may further contain other members, as necessary.

The inorganic polarizing plate is a so-called wire grid polarizer.

The present inventors have found that an inorganic polarizing plate containing at least a substrate, a plurality of linear metal layers, a plurality of linear dielectric layers, and a plurality of linear light-absorbing layers in this order has excellent polarizing properties. Moreover, the present inventors have diligently conducted researches to further improve polarizing properties. As a result, it has found that excellent polarizing properties can be attained with the inorganic polarizing plate containing at least a substrate, a plurality of linear metal layers, a plurality of linear dielectric layers, and a plurality of linear light-absorbing layers in this order by making a bottom base of a trapezoid, which is a cross-sectional shape of the linear metal layer, longer than an upper base of the trapezoid, where the cross-sectional shape is a cross-sectional shape of the linear metal layer cut in a direction orthogonally crossing a longitudinal direction of the linear metal layer, and the trapezoid is a trapezoid with the upper base being at the side of the linear dielectric layer, and the bottom base being at the side of the substrate. The present invention has been accomplished based on these aforementioned insights.

<Substrate>

A material, shape, size, and structure of the substrate are appropriately selected depending on the intended purpose without any limitation, provided that the substrate is transparent to light of a wavelength range for use.

The light of the wavelength range for use is appropriately selected depending on the intended purpose without any limitation, and examples thereof include visible light. Examples of the visible light include light having a wavelength of 380 nm to 810 nm.

The phrase "transparent to light in a wavelength range for use" does not necessarily mean that the transmittance is 100%, and means that it is transparent to a degree that a function as an inorganic polarizing plate is maintained.

Examples of a material of the substrate include glass, crystal, and sapphire. Among them, glass is preferable in view of a cost, and transmittance thereof.

As for a material of the substrate, moreover, a material having a refractive index of 1.1 to 2.2 is preferable.

The average thickness of the substrate is appropriately selected depending on the intended purpose without any limitation, but the average thickness thereof include 300 μm to 1,000 μm.

<Linear Metal Layers>

In the inorganic polarizing plate, the linear metal layers are provided being apart from each other on the substrate at a pitch shorter than wavelengths of the light.

A cross-sectional shape of the linear metal layer cut in a direction orthogonally crossing a longitudinal direction of the linear metal layer is a trapezoid with a bottom base being at the side of the substrate, and an upper base being at the side of the linear dielectric layer.

A length of the bottom base is longer than a length of the upper base.

The length of the bottom base and the length of the upper base can be determined by observing a cross-section of the linear metal layer cut in the direction orthogonally crossing a longitudinal direction of the linear metal layer. The observation of the cross-section can be performed, for example, by means of a scanning electron microscope, or a transmission electron microscope.

A difference between the length of the bottom base and the length of the upper base [(the length of the bottom base)–(the length of the upper base)] in the cross-sectional shape of the linear metal layer is appropriately selected depending on the intended purpose without any limitation, provided that the length of the bottom base is longer than the length of the upper base. The difference is preferably 1.0 nm to 20.0 nm, more preferably 2.0 nm to 12.0 nm.

The linear metal layers may be provided in contact with the substrate. Alternatively, the inorganic polarizing plate may contain a dielectric layer between the linear metal layers and the substrate.

A material of the linear metal layer is appropriately selected depending on the intended purpose without any limitation, and examples thereof include Al, and an Al alloy. Examples of the Al alloy include an AlSi alloy.

The linear metal layer preferably contains Al or an AlSi alloy in view of polarizing properties, and easiness of a process.

The average thickness of the linear metal layer is appropriately selected depending on the intended purpose without any limitation, but the average thickness thereof is preferably 20 nm to 400 nm in view of polarizing properties.

In the present specification, the average thickness is an arithmetic mean value of a height of the metal layer in the trapezoid that is a cross-section of the linear metal layer cut in a direction orthogonally crossing a longitudinal direction of the linear metal layer. For example, the average thickness can be determined by observing the cross-section by means of a scanning electron microscope, or a transmission electron microscope. For example, the average thickness is determined by measuring the height at arbitrary 10 points, and determining the arithmetic mean value of the measured values.

The average width of the linear metal layer is appropriately selected depending on the intended purpose without any limitation, but the average width thereof is preferably 20% to 60% relative to the average pitch between the linear metal layers, in view of polarizing properties and stability of a process.

The average width of the linear metal layer can be determined by observing, for example, by means of a scanning electron microscope, or a transmission electron microscope. For example, the average width thereof is determined by measuring widths of four linear metal layers at arbitrary positions, and determining the arithmetic mean value of the measured values. Note that, the width of the linear metal layer is measured at an upper part of the linear metal layer.

The average pitch between the linear metal layers is appropriately selected depending on the intended purpose without any limitation, but the average pitch is preferably 50 nm to 200 nm, more preferably 80 nm to 150 nm, in view of easiness of production, and stability.

The average pitch can be determined by observing, for example, by means of a scanning electron microscope, or a transmission electron microscope. For example, the average pitch is determined by measuring pitches of the linear metal layers at arbitrary 4 positions, and determining the arithmetic mean value of the measured values. Note that, the pitch is a distance between two adjacent linear metal layers, which is from an upper edge of one linear metal layer at the side of the other linear metal layer, to an upper edge of the other linear metal layer at the opposite side to the side of one linear metal layer.

<Linear Dielectric Layers>

Each linear dielectric layer of the linear dielectric layers is provided on each linear metal layer of the linear metal layers.

A material of the linear dielectric layer is appropriately selected depending on the intended purpose without any limitation, and examples thereof include $SiO_2$, $Al_2O_3$, and $MgF_2$.

A cross-sectional shape of the linear dielectric layer cut in a direction orthogonally crossing a longitudinal direction of the linear dielectric layer is appropriately selected depending on the intended purpose without any limitation, and examples thereof include a rectangle, and a trapezoid.

The average thickness of the linear dielectric layer is appropriately selected depending on the intended purpose without any limitation, but the average thickness thereof is preferably 1 nm to 500 nm, more preferably 3 nm to 80 nm.

The average thickness of the linear dielectric layer can be measured in the same manner as the measurement of the average thickness of the linear metal layer.

<Linear Light-Absorbing Layers>

Each linear light-absorbing layer of the linear light-absorbing layers is provided on each linear dielectric layer of the linear dielectric layers.

The linear light-absorbing layer has a light absorbing function.

In the present specification, the light absorbing function means a function of reducing polarizing waves (TE waves (S-waves)) having an electric field component parallel to a grid formed in the inorganic polarizing plate. Note that, the linear light-absorbing layer passes through polarizing waves (TM waves (P waves)) having an electric field component vertical to the grid.

A material of the linear light-absorbing layer is appropriately selected depending on the intended purpose without any limitation, provided that the linear light-absorbing layer has a light absorbing function. Examples of the material thereof include a metal, a semiconductor, and a metal-containing semiconductor. Examples of the metal include Al, Au, Ag, Cu, and alloys thereof. Examples of the semiconductor include Si, Ge, Te, and ZnO. Examples of a metal contained in the metal-containing semiconductor include Ta, Al, Ag, Cu, Au, Mo, Cr, Ti, W, Ni, Fe, Sn, and Nb. Examples of the metal-containing semiconductor include silicide. Examples of the silicide include β-$FeSi_2$, $MgSi_2$, $NiSi_2$, $BaSi_2$, $CrSi_2$, $CoSi_2$, TaSi, and WSi.

Among them, Si, and silicide are preferable, as an inorganic polarizing plate having a high contrast (extinction ratio: transmission axis transmittance/absorption axis transmittance) to the visible region can be attained. As for the silicide, for example, silicide containing Fe, and silicide containing Ta are preferable.

The metal content in the metal-containing semiconductor is appropriately selected depending on the intended purpose without any limitation, but the metal content is preferably 50 atm % (atomic percent) or less. When the metal content is greater than 50 atm %, transmittance may be reduced.

In the case where silicide containing Fe is used as the metal-containing semiconductor, the Fe content is preferably 50 atm % or less. When the Fe content is greater than 50 atm %, it may be difficult to perform etching even through gas for use is optimized. Moreover, the Fe content is preferably 10 atm % or less, in order to perform etching using $CF_4$, which is widely used in an etching process of a semiconductor.

In the case where silicide containing Ta is used as the metal-containing semiconductor, the Ta content is preferably 40 atm % or less, more preferably 30 atm % or less. When the Ta content is 40 atm % or less, a reflectance of a resulting inorganic polarizing plate is the same level to that at an interface of glass, i.e., 4% or less, and a value of transmittance thereof is also high. Therefore, reduction in the reflectance, and high transmittance can be practically maintained.

The linear light-absorbing layer may have a single-layer structure, or a multilayer structure. For example, the linear light-absorbing layer may be a single layer formed of a metal-containing semiconductor, or two layers formed of a metal or semiconductor, and a metal-containing semiconductor.

When the linear light-absorbing layer has a two-layer structure formed of a metal or semiconductor, and a metal-containing semiconductor, transmittance can be improved with suppressing reflectance, and a contrast can be increased.

The average thickness of the linear light-absorbing layer is appropriately selected depending on the intended purpose without any limitation, but the average thickness thereof is preferably 1 nm to 100 nm, more preferably 5 nm to 80 nm, and even more preferably 10 nm to 40 nm.

The average thickness of the linear light-absorbing layer can be determined in the same manner as the measurement of the average thickness of the linear metal layer.

<Other Members>

The aforementioned other members are appropriately selected depending on the intended purpose without any limitation, and examples thereof include a dielectric layer, and a protective layer.

<<Dielectric Layer>>

The dielectric layer is provided, for example, between the substrate and the linear metal layers.

A material of the dielectric layer is appropriately selected depending on the intended purpose without any limitation. The dielectric layer is preferably a $SiO_2$ layer, as a refractive index thereof is close to that of glass, and it has excellent etching processability, and hence transmittance can be easily enhanced.

The average thickness of the dielectric layer is appropriately selected depending on the intended purpose without any limitation, but the average thickness thereof is preferably 3 nm to 80 nm, in view of polarizing properties.

<<Protective Layer>>

For example, the protective layer is provided to cover the linear light-absorbing layers.

A material of the protective layer is appropriately selected depending on the intended purpose without any limitation, and examples thereof include $SiO_2$.

As the inorganic polarizing plate contains the protective layer, reliability of the inorganic polarizing plate can be improved.

A method for producing the inorganic polarizing plate is appropriately selected depending on the intended purpose without any limitation, but the method thereof is preferably the production method of an inorganic polarizing plate, which is described below.

Figure 1:
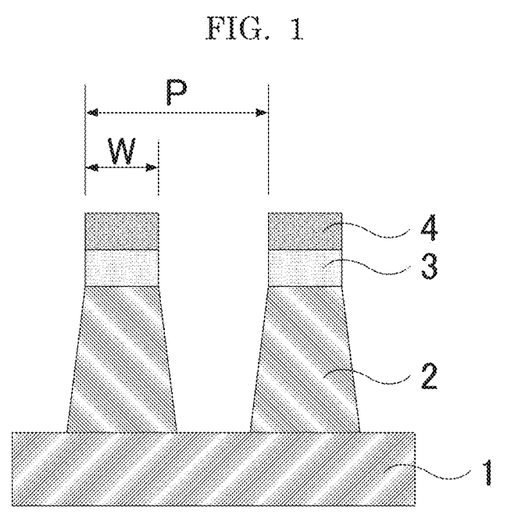
FIG. 1 is a schematic cross-sectional view illustrating one example of the inorganic polarizing plate of the present invention.

FIG. 1 is a schematic cross-sectional view illustrating one example of the inorganic polarizing plate of the present invention. The inorganic polarizing plate illustrated in FIG. 1 contains a substrate 1, a linear metal layer 2, a linear dielectric layer 3, and a linear light-absorbing layer 4. In FIG. 1, the linear metal layer 2, the linear dielectric layer 3, and the linear light-absorbing layer 4 are provided in this order on the substrate 1. A cross-sectional shape of the linear metal layer 2 cut in a direction orthogonally crossing a longitudinal direction of the linear metal layer is a trapezoid. In the trapezoid, a bottom base thereof at the side of the substrate 1 is longer than an upper base thereof at the side of the linear dielectric layer 3.

In FIG. 1, "P" corresponds to a pitch between two linear metal layers 2, and "W" corresponds to a width of the linear metal layer 2.

As with the inorganic polarizing plate of the present invention, light enters from the side of the linear light-absorbing layer 4.

(Production Method of Inorganic Polarizing Plate)

The production method of an inorganic polarizing plate of the present invention contains at least a metal layer etching step, and may further contain other steps, as necessary.

<Metal Layer Etching Step>

The metal layer etching step contains etching a metal layer formed on a substrate using etching gas containing $N_2$.

As a result of the etching, a plurality of linear metal layers are formed being apart from each other on the substrate at a pitch shorter than wavelengths of light. A cross-sectional shape of the formed linear metal layer cut in a direction orthogonally crossing a longitudinal direction of the linear metal layer is a trapezoid with a bottom base being at the side of the substrate and an upper base being at the side of the linear dielectric layer, where a length of the bottom base is longer than a length of the upper base.

The etching gas is appropriately selected depending on the intended purpose without any limitation, provided that the etching gas contains $N_2$. It is preferred that the etching gas further contain $Cl_2$, and $BCl_3$.

As the etching gas contains $N_2$, the trapezoid can be easily produced. In addition, roughness of side surfaces of the linear metal layer can be reduced, to thereby further improve polarizing properties.

An amount of $N_2$ in the etching gas is appropriately selected depending on the intended purpose without any limitation, but the amount thereof is preferably 10% by volume to 50% by volume in view of the etching speed, and reduction of roughness.

One example of the production method of an inorganic polarizing plate according to the present invention is explained with reference to drawings.

Figure 2A:
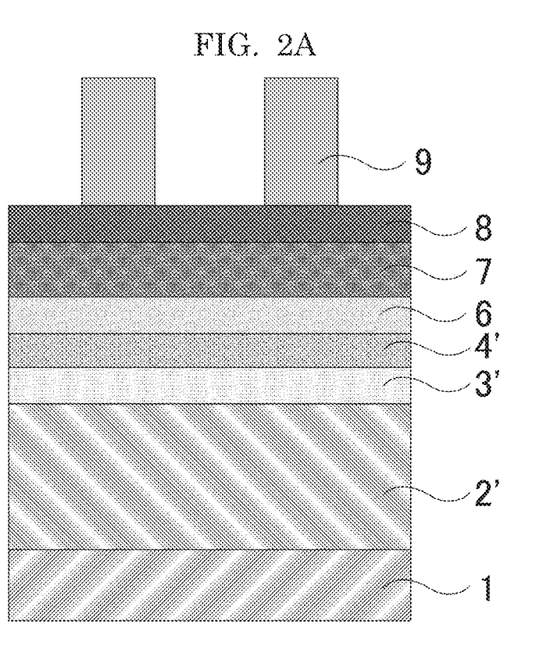
FIG. 2A is a schematic cross-sectional view for explaining one example of the production method of the inorganic polarizing plate of the present invention (part 1).

First, a laminate, in which a metal layer 2' that is a precursor of linear metal layers, a dielectric layer 3' that is a precursor of linear dielectric layers, a light-absorbing layer 4' that is a precursor of linear light-absorbing layers, a first mask layer 6, a second mask layer 7, an antireflection layer 8, and a patterned resist film 9 are laminated in this order on a substrate 1, is provided (FIG. 2A).

A material of the resist film is appropriately selected depending on the intended purpose without any limitation.

A formation method of the patterned resist film is appropriately selected depending on the intended purpose without any limitation, and examples thereof include nanoimprinting, and photolithography.

Formation methods of the metal layer, the dielectric layer, the light-absorbing layer, the first mask layer, the second mask layer, and the antireflection layer are appropriately selected depending on the intended purpose without any limitation, and examples thereof include vapor deposition, and sputtering.

A material of the first mask layer is appropriately selected depending on the intended purpose without any limitation, and examples thereof include $SiO_2$.

A material of the second mask layer is appropriately selected depending on the intended purpose without any limitation, and examples thereof include aluminium.

A material of the antireflection layer is appropriately selected depending on the intended purpose without any limitation.

Figure 2B:
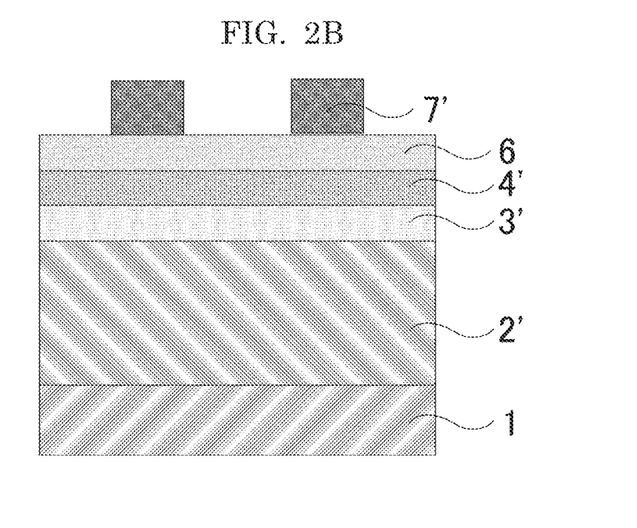
FIG. 2B is a schematic cross-sectional view for explaining one example of the production method of the inorganic polarizing plate of the present invention (part 2).

Subsequently, etching is performed on the antireflection layer 8, and the second mask layer 7 using the resist film 9 as a mask, followed by removing the remaining resist film 9 and antireflection layer 8 (FIG. 2B).

The etching of the antireflection layer 8 is carried out, for example, by dry etching using $Ar/O_2$. The etching of the second mask layer 7 is carried out, for example, by dry etching using $Cl_2$. The removal method of the remaining resist film 9 and antireflection layer 8 is appropriately selected depending on the intended purpose without any limitation.

Figure 2C:
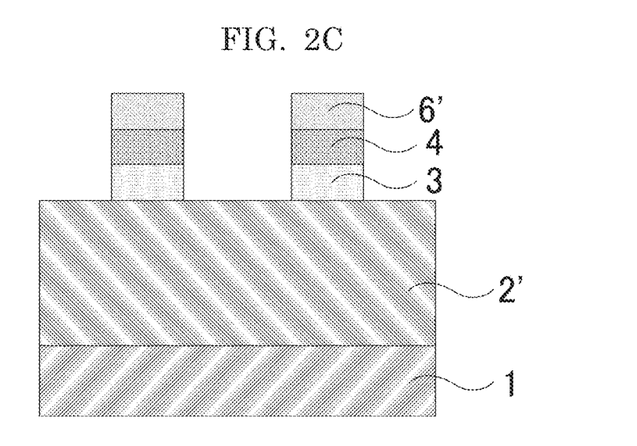
FIG. 2C is a schematic cross-sectional view for explaining one example of the production method of the inorganic polarizing plate of the present invention (part 3).

Subsequently, etching is performed on the first mask layer 6, the light-absorbing layer 4', and the dielectric layer 3' using the patterned second mask layer 7' as a mask, followed by removing the remaining patterned second mask layer 7' (FIG. 2C).

The etching in this process is carried out, for example, by dry etching using $CF_4$.

Figure 2D:
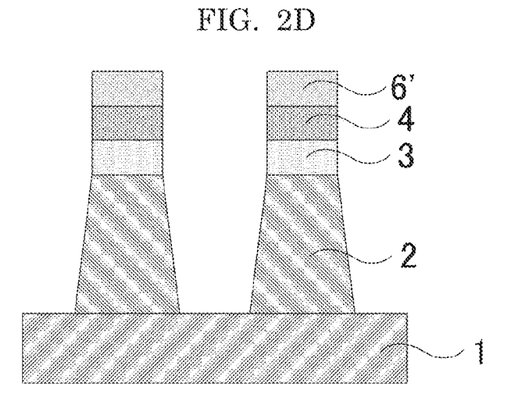
FIG. 2D is a schematic cross-sectional view for explaining one example of the production method of the inorganic polarizing plate of the present invention (part 4).

Subsequently, etching is performed on the metal layer 2' using the patterned first mask layer 6' as a mask, to thereby obtain linear metal layers 2 each in a cross-sectional shape of a trapezoid.

As for the etching in this process, etching gas containing $N_2$ is preferably used, as a cross-sectional shape of the linear metal layer can be easily made a trapezoid. By using the etching gas containing $N_2$, moreover, roughness of side surfaces of the linear metal layer can be reduced, and an inorganic polarizing plate having further excellent polarizing properties can be attained.

Figure 2E:
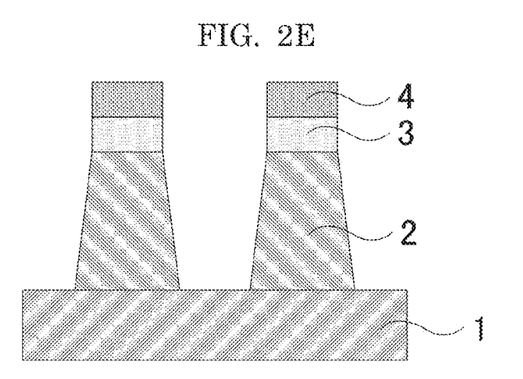
FIG. 2E is a schematic cross-sectional view for explaining one example of the production method of the inorganic polarizing plate of the present invention (part 5).

Subsequently, the patterned first mask layer 6' is removed, to thereby obtain an inorganic polarizing plate.

EXAMPLES

Examples of the present invention are explained hereinafter, but the present invention is not limited to these examples in any way.

Test Example 1

An electromagnetic field simulation was performed by rigorous-coupled wave analysis (RCWA) using a grading simulator, Gsolver, manufactured by Grating Solver Development Co.

In the electromagnetic field simulation, polarizing properties were evaluated, when a shape of the linear metal layer was changed as in FIG. 3A, FIG. 3B, FIG. 3C, and FIG. 3D.

In each of the inorganic polarizing plate of FIGS. 3A, 3B, 3C, and 3D, a dielectric layer 5 ($SiO_2$: 30 nm), linear metal layers 2 (Al: 190 nm), linear dielectric layers 3 ($SiO_2$: 7.5 nm), and linear light-absorbing layers 4 (FeSi (Fe 5 atm %): 25 nm) were formed on a substrate 1 in this order. In FIGS. 3A, 3B, 3C, and 3D, the dielectric layer 5, the linear metal layers 2, the linear dielectric layers 3, and the linear light-absorbing layers 4 were respectively the same voltage. Moreover, a pitch of the grid was 141 nm. The top width, the middle width, and the bottom width of the cross-section of the linear metal layer 3 are depicted in Table 1.

Polarizing properties of the inorganic polarizing plate when light in the wavelength range of 520 nm to 590 nm was incident from the side of the linear light-absorbing layers 4 were evaluated. The results are presented in Table 1.

TABLE 1

Figure 3A:
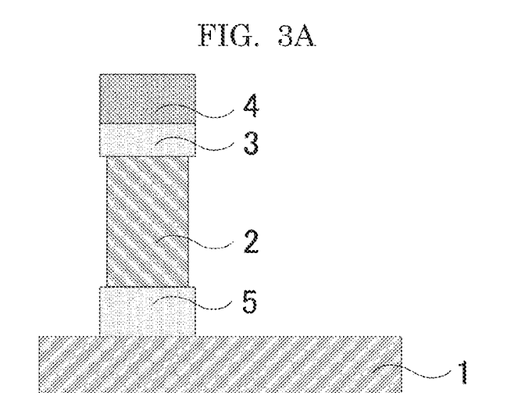
FIG. 3A is a schematic cross-sectional view of the inorganic polarizing plate of Condition 1 in Test Example 1.
Figure 3B:
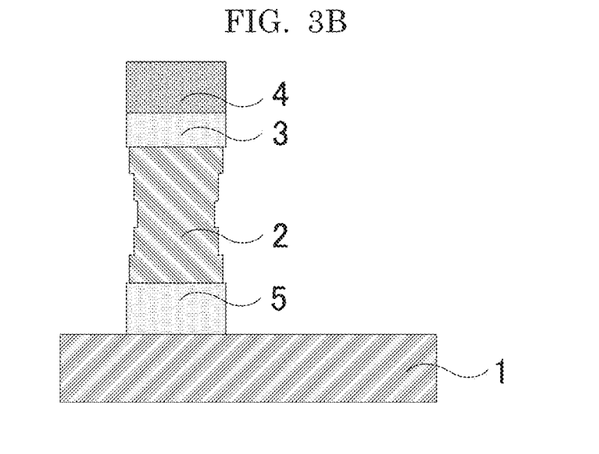
FIG. 3B is a schematic cross-sectional view of the inorganic polarizing plate of Condition 2 in Test Example 1.
Figure 3C:
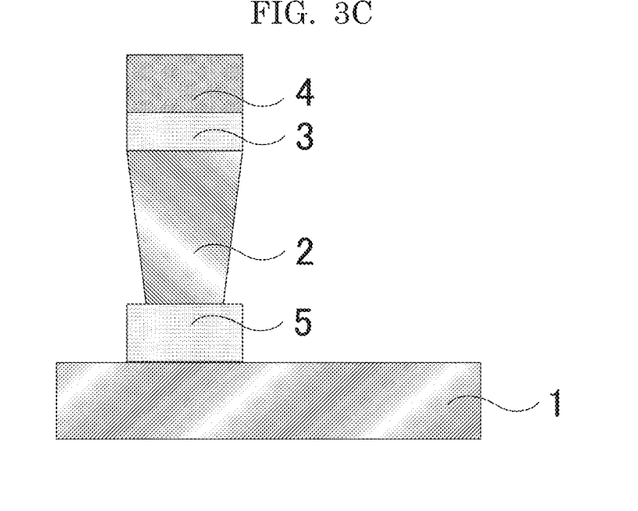
FIG. 3C is a schematic cross-sectional view of the inorganic polarizing plate of Condition 3 in Test Example 1.
Figure 3D:
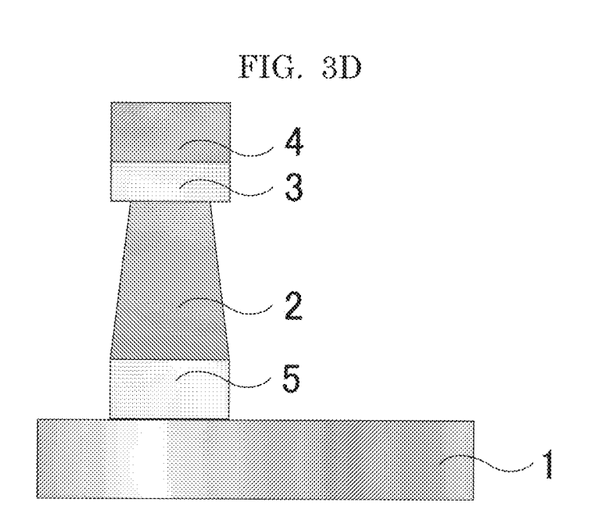
FIG. 3D is a schematic cross-sectional view of the inorganic polarizing plate of Condition 4 in Test Example 1.

| | Model | Top width (nm) | Middle width (nm) | Bottom width (nm) | Gch 520-590 nm | | | |
|---|---|---|---|---|---|---|---|---|
| | | | | | Tp | CR | Rp | Rs |
| Condition 1 | FIG. 3A | 35.25 | 35.35 | 35.25 | 89.3% | 2,269 | 3.4% | 1.6% |
| Condition 2 | FIG. 3B | 42.30 | 28.20 | 42.30 | 89.0% | 2,435 | 3.2% | 2.1% |
| Condition 3 | FIG. 3C | 42.30 | 35.25 | 28.20 | 86.2% | 2,100 | 6.1% | 2.2% |
| Condition 4 | FIG. 3D | 28.20 | 35.25 | 42.30 | 91.2% | 2,486 | 1.4% | 1.6% |

In the present specification, each symbol is as follows.
Tp: transmission axis transmittance
CR: contrast (transmission axis transmittance/absorption axis transmittance)
Rp: transmission axis reflectance
Rs: absorption axis reflectance It was confirmed from Table 1 that Condition 4, which was an embodiment of the present invention, had high transmission axis transmittance, a large contrast, and low transmission axis reflectance compared to Conditions 1 to 3, which were not embodiments of the present invention, Condition 4 attained excellent polarizing properties in a green light region (around 550 nm), which was important for practical use in a liquid crystal display device.

Test Example 2

Samples, in which shapes of linear metal layers were changed, were produced, and polarizing properties thereof were evaluated.

Specifically, inorganic polarizing plates having cross-sectional shapes (SEM photographs) depicted in FIGS. 4A to 4E were produced, and polarizing properties thereof were evaluated.

Each sample had a structure where a dielectric layer ($SiO_2$: 35 nm), linear metal layers (Al: 200 nm), linear dielectric layers (SiO$_2$: 10 nm), and linear light-absorbing layers (FeSi (Fe 5 atm %): 25 nm) were formed on a substrate (glass) in this order. Moreover, a pitch of the grid was 141 nm. A cross-sectional shape of the linear metal layer was changed by varying etching conditions. Specifically, the cross-sectional shape of the linear metal layer was changed by varying an amount of N$_2$ in Cl$_2$/BCl$_3$ etching gas.

Figure 5:
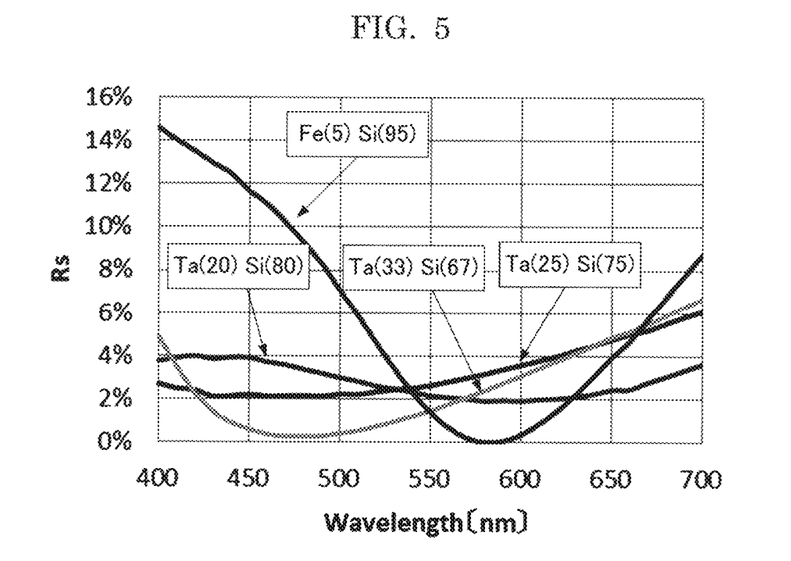
FIG. 5 is a graph depicting the simulation result of absorption axis reflectance (Rs) in Test Example 3.
Figure 6:
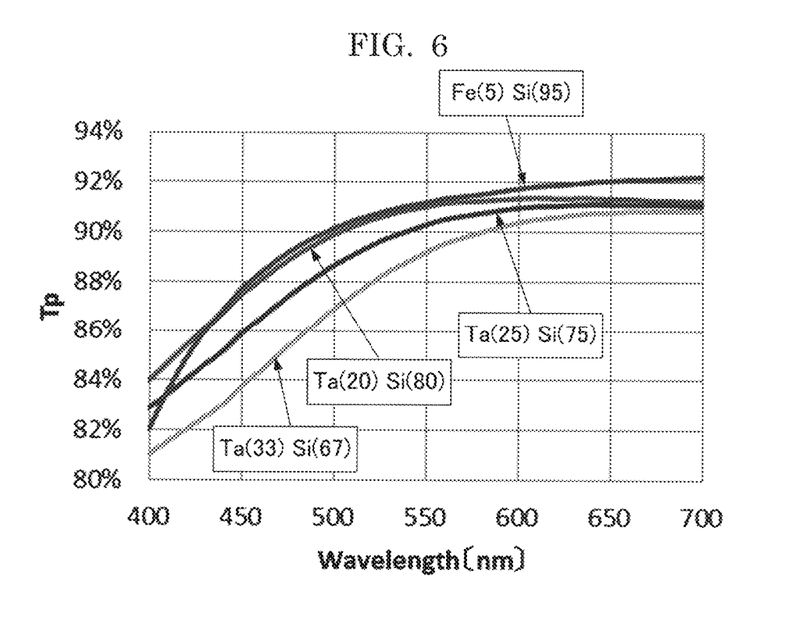
FIG. 6 is a graph depicting the simulation result of transmission axis transmittance (Tp) in Test Example 3.

As for the evaluations of polarizing properties, transmittance was evaluated by means of U-4100 manufactured by Hitachi High-Technologies Corporation, and reflectance was evaluated by means of V-570 manufactured by JASCO Corporation. Light was incident from the side of the linear light-absorbing layers. The results are presented in Table 2. Moreover, a difference (TOP–Bottom) between a top width (TOP) and a bottom width (Bottom) of the linear metal layer in each of FIGS. 4A to 4E is also depicted in Table 2.

was FIG. 3D (Condition 4), and a pitch of the grid was 141 nm. It was confirmed that the absorption axis reflectance could be further reduced by using TaSi (silicide containing Ta) as a material of the linear light-absorbing layers, and low reflectance was obtained in a wide wavelength range. The Ta content was evaluated with 20 atm %, 25 atm %, and 33 atm % as depicted in FIG. 5. The same level of the absorption axis reflectance was obtained as depicted in Table 3 and FIG. 5, but the transmission axis transmittance tended to reduce as the Ta content was increased, as depicted in Table 3 and FIG. 6. Accordingly, as for a polarizing plate desired to have both high transmittance and low reflectance, the Ta content t is preferably set 40 atm % or less, more preferably 30 atm % or less.

TABLE 3

| Material of linear light-absorbing layer (atm %) | Film thickness (nm) | | | | Optical properties λ400-700 nm | | | |
| --- | --- | --- | --- | --- | --- | --- | --- | --- |
| | Linear light-absorbing layer | Linear dielectric layer | Linear metal layer | Dielectric layer | Tp | CR | Rp | Rs |
| Ta (20) Si (80) | 15 | 50 | 190 | 30 | 89.8% | 4,139 | 0.9% | 2.9% |
| Ta (25) Si (75) | 15 | 60 | 190 | 30 | 89.0% | 4,422 | 0.9% | 3.3% |
| Ta (33) Si (67) | 15 | 70 | 190 | 30 | 87.8% | 3,779 | 1.0% | 2.7% |
| Fe (5) Si (95) | 25 | 7.5 | 190 | 30 | 90.0% | 2,255 | 1.3% | 6.1% |

TABLE 2

Figure 4A:
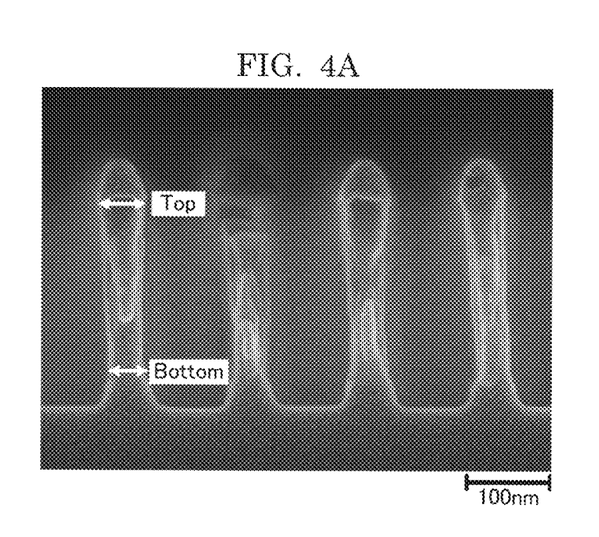
FIG. 4A is a schematic cross-sectional view of the inorganic polarizing plate of Sample A in Test Example 2.
Figure 4B:
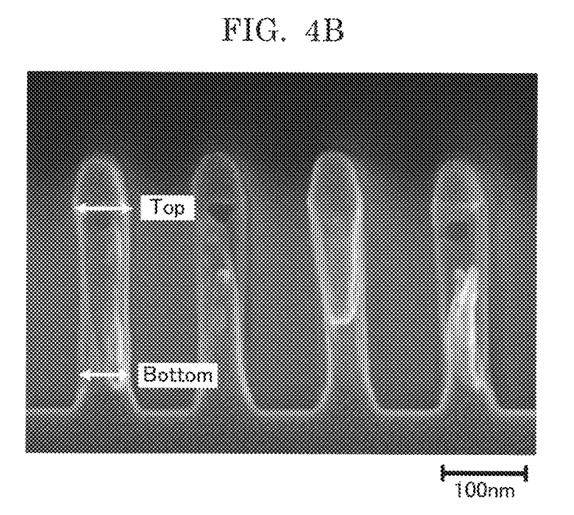
FIG. 4B is a schematic cross-sectional view of the inorganic polarizing plate of Sample B in Test Example 2.
Figure 4C:
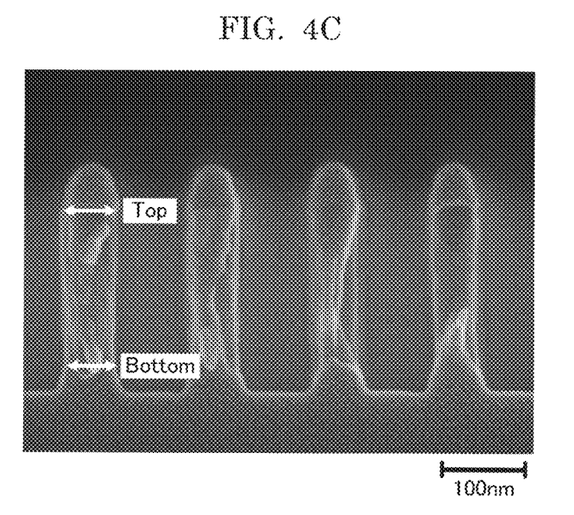
FIG. 4C is a schematic cross-sectional view of the inorganic polarizing plate of Sample C in Test Example 2.
Figure 4D:
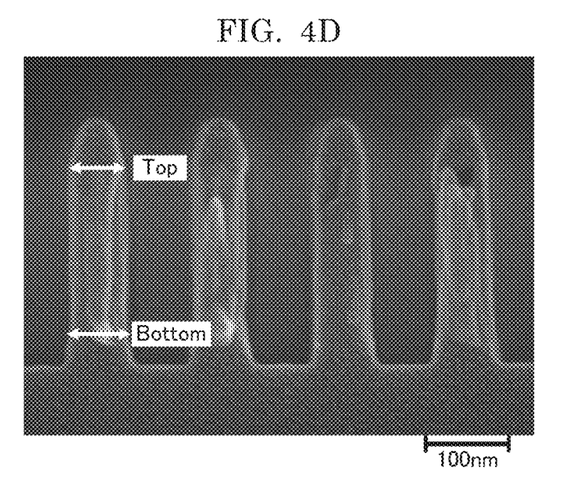
FIG. 4D is a schematic cross-sectional view of the inorganic polarizing plate of Sample D in Test Example 2.
Figure 4E:
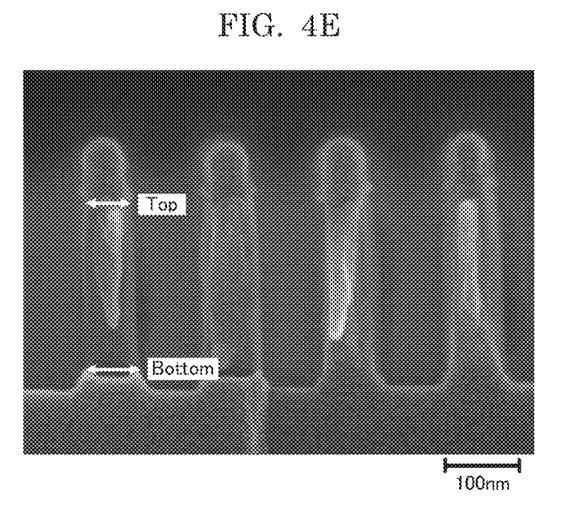
FIG. 4E is a schematic cross-sectional view of the inorganic polarizing plate of Sample E in Test Example 2.

| | | Gch 520-590 nm | | |
| --- | --- | --- | --- | --- |
| Sample | Width (Top-Bottom) | Tp | CR | Rp |
| A FIG. 4A | 11.1 nm | 89% | 977 | 3.6% |
| B FIG. 4B | 4.6 nm | 88% | 3,667 | 2.3% |
| C FIG. 4C | 1.5 nm | 88% | 4,962 | 1.9% |
| D FIG. 4D | −3.3 nm | 86% | 16,832 | 0.9% |
| E FIG. 4E | −11.9 nm | 87% | 17,239 | 0.5% |

It was confirmed from Table 2 that Samples D and E, which were embodiments of the present invention, had a large contrast, and low transmission axis reflectance compared to Samples A, B, and C, which were not embodiments of the present invention, and Samples D and E attained excellent polarizing properties.

Test Example 3

An electromagnetic field simulation was performed by rigorous-coupled wave analysis (RCWA) using a grading simulator, Gsolver, manufactured by Grating Solver Development Co.

Figure 7:
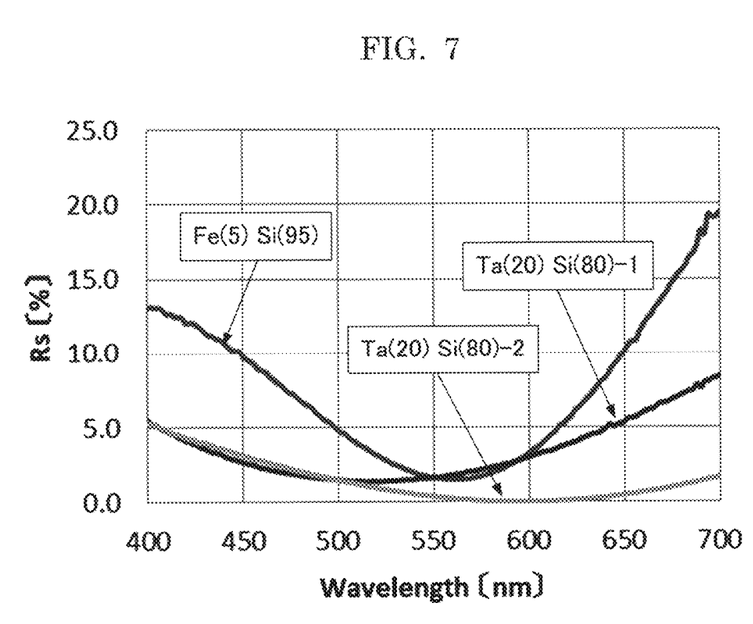
FIG. 7 is a graph depicting the measurement result of absorption axis reflectance (Rs) in Test Example 4.

In the electromagnetic field simulation, polarizing properties were evaluated when a material of the linear light-absorbing layers was changed as depicted in Table 3 below. Note that, film thicknesses of the linear light-absorbing layer and the linear dielectric layer were adjusted in a manner that the absorption axis reflectance Rs became low corresponding to optical multiplier of each material of the linear light-absorbing layers. Moreover, a model of the simulation Based on the results obtained by the simulation, a sample same as Sample D in Test Example 2 was produced using TaSi (Ta 20 atm %) for linear light-absorbing layers, and absorption axis reflectance was evaluated. The results are presented in Table 4 and FIG. 7. Similarly to the simulation results, a reduction effect of the absorption axis reflectance Rs could be confirmed.

TABLE 4

| | Film thickness (nm) | | | |
| --- | --- | --- | --- | --- |
| Material of linear light-absorbing layer (atm %) | Linear light-absorbing layer | Linear dielectric layer | Linear metal layer | Dielectric layer |
| Fe(5)Si(95) | 25 | 7.5 | 200 | 35 |
| Ta(20)Si(80)-1 | 15 | 50 | 200 | 35 |
| Ta(20)Si(80)-2 | 20 | 40 | 200 | 35 |

Test Example 4

A test for confirming an improvement of smoothness of side surfaces of linear metal layers in production of the inorganic polarizing plate of the present invention, when etching gas contained N$_2$ in the process of producing the linear metal layers, was performed.

Specifically, a surface roughness (arithmetic mean roughness: Ra) of an aluminium film was measured by etching the aluminium film formed on a glass substrate using etching gas, a N$_2$ concentration of which was changed, was measured. The aluminium film was formed by sputtering.

Ra was measured by means of an atomic force microscope (AFM). The measuring area was 1 μm×1 μm.

The results are presented in Table 5.

TABLE 5

| | $Cl_2$ sccm | $BCl_3$ sccm | $N_2$ sccm | Ra nm |
|---|---|---|---|---|
| *Al film surface before etching | | | | 2.627 |
| No $N_2$ added | 16 | 8 | — | 5.009 |
| $N_2$ flow rate 17.2% | 16 | 8 | 5 | 3.315 |
| $N_2$ flow rate 29.4% | 16 | 8 | 10 | 4.071 |
| $N_2$ flow rate 45.5% | 16 | 8 | 20 | 3.322 |

Ra of the aluminium film surface after etching was smaller when the aluminium film was etched using etching gas $N_2$, than when the aluminium film was etched using etching gas free from $N_2$.

Since the inorganic polarizing plate of the present invention excels in polarizing properties, the inorganic polarizing plate of the present invention can be suitably used for a liquid crystal display device.

This application claims priority to Japanese application No. 2014-169274, filed on Aug. 22, 2014 and incorporated herein by reference.

What is claimed is:

1. An inorganic polarizing plate, comprising:
    a substrate that is transparent to light in a wavelength range for use;
    a plurality of linear metal layers;
    a plurality of linear dielectric layers; and
    a plurality of linear light-absorbing layers having a light absorbing function, where the substrate, the linear metal layers, the linear dielectric layers, and the linear light-absorbing layers are provided in this order,
    wherein the linear metal layers are aligned being apart from each other on the substrate at a pitch shorter than wavelengths of the light,
    wherein each linear dielectric layer of the linear dielectric layers is provided on each linear metal layer of the linear metal layers,
    wherein each linear light-absorbing layer of the linear light-absorbing layers is provided on each linear dielectric layer of the linear dielectric layers,
    wherein a cross-sectional shape of the linear metal layer cut in a direction orthogonally crossing a longitudinal direction of the linear metal layer is a trapezoid with a bottom base being at a side of the substrate, and an upper base being at a side of the linear dielectric layer, where a length of the bottom base is longer than a length of the upper base,
    wherein a difference between the length of the bottom base and the length of the upper base [(the length of the bottom base)−(the length of the upper base)] is 1.0 nm to 12.0 nm in the cross-sectional shape of the linear metal layer,
    wherein a material of the linear metal layer is aluminum,
    wherein a material of the linear dielectric layer is $SiO_2$, and
    wherein a material of the linear light-absorbing layer is Si, or silicide.

2. The inorganic polarizing plate according to claim 1, wherein an average thickness of the linear metal layer is 20 nm to 400 nm.

3. The inorganic polarizing plate according to claim 1, wherein the silicide is silicide containing Fe in an amount of 10 atm % or less.

4. The inorganic polarizing plate according to claim 1, wherein the silicide is silicide containing Ta in an amount of 40 atm % or less.

5. The inorganic polarizing plate according to claim 1, wherein a material of the substrate is glass, crystal, or sapphire.

6. A production method of the inorganic polarizing plate according to claim 1, comprising:
    etching a metal layer formed on the substrate using etching gas containing $N_2$.

7. The production method according to claim 6, wherein the etching gas contains $Cl_2$ and $BCl_3$.

* * * * *